US007379813B2

(12) United States Patent
Kubota et al.

(10) Patent No.: US 7,379,813 B2
(45) Date of Patent: May 27, 2008

(54) DRIVING SUPPORT SYSTEM AND DRIVING SUPPORT MODULE

(75) Inventors: Tomoki Kubota, Okazaki (JP); Hideto Miyazaki, Okazaki (JP)

(73) Assignee: Aisin AW Co., Ltd., Anjo-Shi, Aichi (JP)

( * ) Notice: Subject to any disclaimer, the term of this patent is extended or adjusted under 35 U.S.C. 154(b) by 74 days.

(21) Appl. No.: 11/217,509

(22) Filed: Sep. 2, 2005

(65) Prior Publication Data

US 2006/0055525 A1 Mar. 16, 2006

(30) Foreign Application Priority Data

Sep. 3, 2004 (JP) ............................ 2004-257368

(51) Int. Cl.
*G01C 21/32* (2006.01)
*G05D 1/02* (2006.01)

(52) U.S. Cl. ...................................... 701/211; 701/300

(58) Field of Classification Search ................ 701/211, 701/300, 301; 340/436; 398/118
See application file for complete search history.

(56) References Cited

U.S. PATENT DOCUMENTS 5,907,293 A 5/1999 Tognazzini ................. 340/903
6,411,898 B2 * 6/2002 Ishida et al. ................ 701/211
6,756,916 B2 * 6/2004 Yanai ......................... 340/936
6,853,849 B1 2/2005 Tognazzini ................. 455/457
6,946,978 B2 * 9/2005 Schofield ............... 340/995.28
7,068,155 B2 * 6/2006 Kade et al. ................. 340/436
7,161,616 B1 * 1/2007 Okamoto et al. ........... 348/148
2001/0040505 A1 11/2001 Ishida et al. ................ 340/435
2004/0178894 A1 9/2004 Janssen ...................... 340/435

FOREIGN PATENT DOCUMENTS

JP 07-223488 8/1995
JP 2001-141495 5/2001
JP 2001-347853 12/2001
WO WO 3005102 A1 * 1/2003
WO WO 2006/037402 A1 * 4/2006

* cited by examiner

*Primary Examiner*—Mark Hellner
(74) *Attorney, Agent, or Firm*—Bacon & Thomas, PLLC

(57) ABSTRACT

A driving support system has a capability of displaying information in such a manner that the information can be directly used by a driver in driving the vehicle, thereby further enhancing driving safety of the vehicle. The driving support system acquires judgment information and, based on such information, decides whether to issue a warning to the driver. Virtual image information, corresponding to the type of the warning, is generated responsive to a decision that a warning should be given, which virtual image information is displayed to the driver.

3 Claims, 16 Drawing Sheets

DRIVING SUPPORT SYSTEM AND DRIVING SUPPORT MODULE

INCORPORATION BY REFERENCE

The disclosure of Japanese Patent Application No. 2004-257368 filed on Sep. 3, 2004, including the specification, drawings and abstract thereof, is incorporated herein by reference in its entirety.

BACKGROUND OF THE INVENTION

1. Field of the Invention

The present invention relates to a driving support system including vehicle location detection means for detecting the location of the vehicle and display means for displaying navigation information in the form of an image. The present invention also relates to a driving support module for use in such a driving support system.

2. Description of the Related Art

An on-board navigation apparatus is a widely known driving support system. The on-board navigation apparatus typically includes vehicle location detection means for detecting the location of the vehicle and a map information database in which map information is stored, whereby the vehicle location detected by the vehicle location detection means is displayed on a map image of an area around the vehicle location, thereby providing guidance (navigation) to a destination. For example, navigation information is provided such that a route to a destination is displayed in a highlighted fashion and image information associated with the vicinity of an intersection is also displayed. Some navigation apparatus have the capability of providing a voice message such as "intersection at which to make a left turn will be reached soon". The driving support system of this type typically includes display means (a display unit, an in-panel display, or a head-up display integrated with the navigation apparatus) for displaying a navigation route and other information, but the purpose of the display means is basically to provide navigation information.

For example, in a driving support system (disclosed in Japanese Unexamined Patent Application Publication No. 2001-141495), display means is used to display an image of a virtual vehicle on the windshield so that the virtual vehicle guides a driver along a route to a destination. This "head-up" display system allows the driver to easily understand the route, and thus ensures that the driver can drive his/her car to the destination in a highly reliable manner.

A driving support system such as a navigation apparatus also has a map database and a camera for taking an image of the view (scene) ahead of the vehicle on which the driving support system is installed, such that various types of information associated with an area around the current location of the vehicle can be acquired.

However, such information is not directly displayed on the display means, although the information is used to enhance driving safety.

SUMMARY OF THE INVENTION

In view of the above, the present invention provides a system that not only provides information for the purpose of simply enhancing the safety of driving a vehicle, as with a driving support system such as a navigation apparatus, but that also has a capability of displaying information in a manner in which the information can be directly used by a driver in driving the vehicle, thereby further enhancing driving safety. The present invention also provides a driving support module for use in such a system, capable of detecting a blind spot which cannot be seen by a driver and which is thus a factor that can result in danger to the vehicle and driver.

The driving support system according to one embodiment of the present invention includes vehicle location detection means for detecting the location of a vehicle and display means for displaying navigation information in the form of an image. The driving support system further includes judgment information acquisition means for acquiring judgment information, based on which a decision is made as to whether or not to give a warning to a driver, judgment means for judging whether or not to give the warning to the driver, based on the judgment information acquired by the judgment information acquisition means, and image information generation means for generating virtual image information depending on (corresponding to) the type of warning, responsive to a judgment by the judgment means that the warning should be given, wherein the virtual image information generated by the image information generation means is displayed on the display means.

FIGS. 2A, 2B, 4A, 4B and 6 show specific examples of the virtual image information. In the examples shown in FIGS. 2A, 2B and 6, an image of a virtual pedestrian is generated as the virtual image information. In the examples shown in FIGS. 4A and 4B, an image of a virtual motorcycle, possibly positioned so that it cannot be seen by the driver of the vehicle, is generated as the virtual image information. Plural items of virtual image information may be prepared for use in various situations in which a warning should be given to a driver, and one of such items of virtual image information may be selected, depending on the actual situation encountered by the vehicle, or virtual image information may be modified depending on the actual situation.

The virtual image information generated by the image information generation means is displayed on the display means. The virtual image information displayed on the display means can act as a warning to a driver or a passenger, thereby enhancing driving safety.

The judgment information may be one item of or any combination of items of image information supplied from an on-board camera, map information associated with roads or facilities within a particular distance from the current vehicle location, vehicle status information associated with operation of the vehicle, traffic information acquired via communication means as to another vehicle or a road, and time information indicating the current time.

The image taken by the camera can be used to detect and/or view a blind spot that cannot be seen by the driver, and to obtain an image of an object in the blind spot which might be a danger, can be used as virtual image information. Map information can be used to detect a school or the like located in the vicinity (local area) of the vehicle's current location. When the vehicle is in an area including a school and within a time zone in which pupils pass through the area to or from the school, virtual image information including an image of a virtual pedestrian walking along a pedestrian crossing close to the school is generated and supplied to the display means to give a warning. When a vehicle is approaching a corner at which visibility is bad, an image of the corner is displayed as a virtual image on the display means to inform the driver of the poor visibility at the corner.

The vehicle status information includes, for example, information indicating the running speed of the vehicle and/or information indicating that the vehicle is going to turn to the right or to the left. When the vehicle is going to turn to the right or left at a high speed, if a motorcycle suddenly appears from behind a large-size vehicle or if a similar dangerous situation occurs, there is the possibility that the driver cannot have sufficient time/warning to handle the dangerous situation. In particular, when a turn to the right or left is made, such a dangerous situation can often occur. Thus, the vehicle status information can be used to determine, with high reliability, whether or not the vehicle is in a situation that requires a warning to the driver.

In a situation in which a vehicle is approaching an intersection or other road junction, traffic information can be used to determine, for example, whether there is another vehicle approaching the intersection or the junction from the opposite or another direction. Thus, in such a situation, it is desirable that a judgment as to whether to give a warning to a driver be made based on the traffic information, and an image of a virtual vehicle corresponding to the vehicle approaching the intersection or the junction from the opposite or another direction be generated and displayed.

The time information may be used to determine whether the current time is in a time period for school attendance and thus whether the current time is within a particular time period in which there are likely to be many pedestrians at a pedestrian crossing.

More specifically, in the driving support system, the judgment information is preferably image information, the judgment means includes blind spot judgment means for determining existence of a blind spot that cannot be seen by the driver, based on the image information, and, if the blind spot judgment means determines that there is a blind spot, the image information generation means generates virtual image information including a virtual object drawn at a location corresponding to the detected blind spot.

Thus, the present invention makes it possible to detect a blind spot in the driver's field of view by analyzing the image information using the blind spot judgment means, and to include an image of a virtual small-size vehicle, motorcycle, or pedestrian as a virtual object in the virtual image information. By displaying the resultant virtual image information, it is possible to warn the driver of the presence of a dangerous or potentially dangerous situation.

The driving support system of the present invention preferably has the capability of acquiring map information or traffic information as the judgment information, the judgment means preferably includes event judgment means for determining, from the map information or the traffic information, whether there is an event of which the driver should be aware, and when the event judgment means determines that there is such an event, the image information generation means generates virtual image information including a virtual object drawn at a location corresponding to the detected event. This makes it possible to handle a dangerous situation in which the vehicle is running through a school zone, is approaching a corner, or is approaching an intersection or other road junction simultaneously approached by another vehicle from a different direction. More specifically, for example, when the vehicle is passing through a school zone, the event judgment means detects a school from the map information. When the vehicle is approaching a corner, the event judgment means detects the corner from the map information. Furthermore, the event judgment means determines whether or not the vehicle is in a situation that dictates issuance of a warning to the driver. If the event judgment means determines that the vehicle is in a situation where a warning to the driver is appropriate, the image information generation means generates virtual image information including an image of a virtual object indicative of the situation actually encountered (for example, an image of a pedestrian within a crossing close to a school, an image indicating the shape or feature of a corner, or an image of a vehicle coming from the opposite direction). The resultant virtual image information is displayed on the display means to contribute to safety in driving the vehicle.

Preferably, the driving support system of the present invention further includes warning point candidate registration means for determining, in advance, candidate warning points along the route to the destination, as indicated by navigation information, and for registering the candidate warning points, wherein when the vehicle reaches one of candidate warning points, it is further determined whether or not to issue a warning, and virtual image information is produced and displayed if it is determined that the warning should be given.

In some driving support systems wherein a navigation route is displayed as navigation information, the navigation route to a destination is determined in advance.

In this case, it is possible to identify or determine, in advance, warning points, i.e. points where a warning to the driver may be appropriate. For example, there is a high probability that a warning should be given to a driver when a turn to the right is made at an intersection. When the vehicle is to turn to the right at an intersection, if another vehicle is approaching the intersection from the opposite direction, attention to a blind spot is needed. Thus, the warning point candidate registration means registers in advance such an intersection as a warning point candidate.

When the vehicle reaches one of such warning point candidates, a further determination is made based on other judgment information. This makes it possible to ensure the safety of the vehicle in driving along the navigation route by limiting such a determination to only the candidate warning points.

In some cases, unlike the example described above, no particular navigation route is determined in advance. In this case, the vehicle does not travel along a predetermined particular route for which sufficient guidance information which has been collected, but along a route that is not specified in advance. To handle such a situation, the driving support system of the present invention may further include warning point judgment means for determining whether the vehicle is at one of the candidate warning points. If the warning point judgment means determines that the current location of the vehicle is at one of candidate warning points, a determination may be made as to whether to give a warning, and virtual image information may be produced and displayed if it is determined that the warning should be given. In such an embodiment, for example, a preliminary judgment is made on a point-by-point basis as to whether the vehicle is at one of the candidate warning points, based on information indicating whether the vehicle is in the middle of an intersection or about to enter an intersection. If it is determined in the preliminary judgment that the vehicle is at one of the candidate warning points, a further judgment is made. This allows a reduction in the processing load imposed on the driving support system.

Preferably, the virtual image information is combined with the image taken by the on-board camera, and the resultant combined image is displayed. This allows the driver to easily recognize the potentially dangerous situation which is the subject of the warning given by the system, in addition to other information included in the image taken by the on-board camera.

The driving support system may further include an on-board camera, and if an image of an actual object corresponding to a virtual object, included in the virtual image information is taken by the on-board camera, the virtual object displayed on the display means may be changed. By changing the mode in which the image of the virtual object is displayed into a mode in which the image of an actual object (in the image captured by on-board camera) is displayed when the object actually appears in the driver's field of view, it becomes possible for the driver to clearly recognize the presence of the object. This greatly contributes to driving safety.

In the driving support system described above, a blind spot that cannot be seen by the driver is detected, and an image of a virtual object is displayed at a position corresponding to the detected blind spot to give a warning to the driver. The detection of such a blind spot may be performed using a driving support module constructed in the manner described below.

The preferred driving support module includes an on-board camera for taking an image of a scene ahead of the vehicle, blind spot judgment means for determining whether there is a blind spot that cannot be seen by the driver, based on image information provided by the on-board camera, and output means for outputting blind spot information, when the blind spot judgment means determines that there is a blind spot.

When a blind spot that cannot be seen by the driver is detected, there is a possibility that there is, within the blind spot, an object or circumstance which might pose a danger to the vehicle. Thus, it is desirable to display an image of a virtual object at the blind spot as described above.

When a blind spot is detected by the safety support unit, the vehicle speed may be limited to a range lower than a predetermined upper limit, or a voice warning or a warning by a vibration may be given to the driver, further contributing to driving safety.

DESCRIPTION OF THE PREFERRED EMBODIMENTS

Embodiments of the driving support system 100 according to the present invention are described below with reference to the accompanying drawings.

Driving Support System

Figure 1:
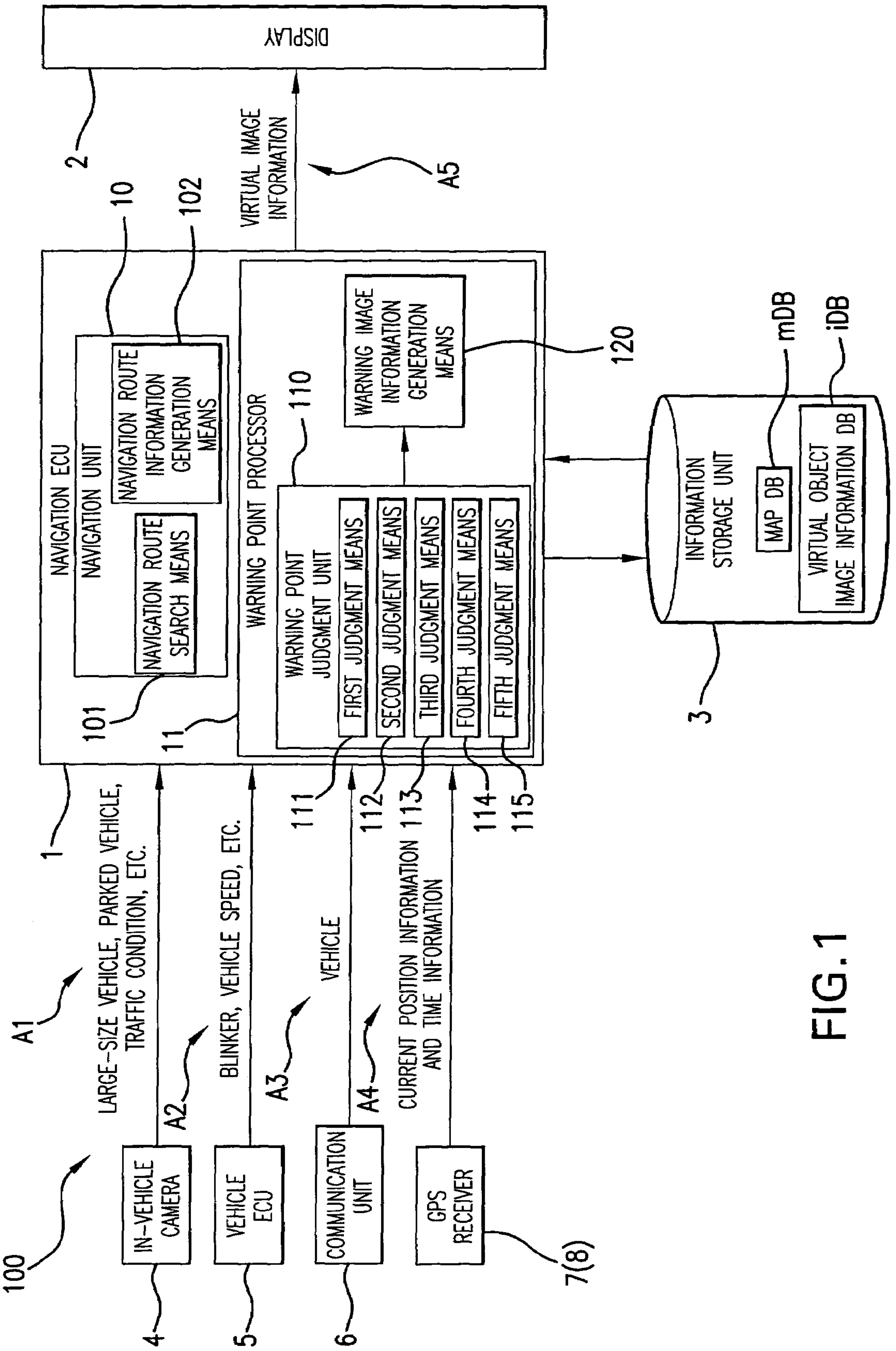
FIG. 1 is a block diagram of a driving support system according to the present invention.

As shown in FIG. 1 in one embodiment of the present invention, the driving support system 100 includes a navigation ECU (navigation electronic control unit) 1 having a navigation capability and a display unit 2 serving as display means for displaying information output from the navigation ECU 1.

The navigation ECU 1 is connected to an information storage unit 3 such that information can be exchanged between the information storage unit 3 and the navigation ECU 1. The navigation ECU 1 is also connected to an on-board camera 4 for taking an image of a scene ahead of a vehicle, a vehicle ECU 5 for controlling operating conditions of the vehicle mc in accordance with commands issued by a driver, a communication unit 6 for vehicle-to-vehicle communication and/or a road-to-vehicle communication (communication with a stationary station), and a current position detector 8 including a GPS receiver 7, such that the navigation ECU 1 can communicate with such units. The on-board camera 4 is installed at a position that allows it to take an image of a view that can be seen by the driver so that the image provides information representing the view seen by the driver.

The units 3, 4, 5, 6, and 7 are used to acquire judgment information used to determine whether to issue a warning regarding driving operation, and thus form the judgment information acquisition means of the present invention.

In the present embodiment of the invention, the navigation ECU 1 determines whether a warning should be given to the driver of the vehicle, depending on the status of the vehicle mc (that is, depending on the current position and the speed of the vehicle and/or depending on whether the vehicle is going to turn to the right or left), based on judgment information input to or stored in the navigation ECU 1. If it is determined that the warning should be given, the navigation ECU 1 generates virtual image information depending on the type of the warning and displays the virtual image information on the display unit 2.

In the embodiment shown in FIG. 1, a head-up display is used as the display unit 2. A head-up display (HUD) unit typically includes a projector which projects a display onto a portion of the windshield. Another type of HUD projects a two-dimensional image onto the driver's eye on a see-through basis, using a holographic optical element, as described for example in U.S. Pat. No. 6,922,267. A virtual image such as that shown in FIG. 2, 4, 6, 8, or 10 is displayed on the head-up display 2 depending on the running condition of the vehicle mc, as will be described later. Note that the display unit 2 used as the display means for the above purpose is not limited to a head-up display, but other types of displays such as a liquid crystal display or a meter panel display may also be used.

Judgment Information

The judgment information used in making judgments by the navigation ECU 1 is described below.

As shown in FIG. 1, a map database mDB is stored in the information storage unit 3 connected for data exchange with the navigation ECU 1. By accessing the map database mDB, it is possible to acquire information about intersections (crossings cr), pedestrian crossings, corners C, schools s, and the like located on a navigation route or close to the vehicle. In the present invention, such information acquirable from the map database mDB is generically referred to as "map information".

As shown in FIG. 1, "image information" output from the on-board camera 4 is captured by the navigation ECU 1. By using image analysis software, the navigation ECU 1 detects other vehicles present in an area covered by the image information and identifies the type or the status of the detected vehicles. For example, a determination is made to determine whether the other vehicle is a large-size vehicle bc and/or to determine whether the vehicle is parked or stopped or stopping. More specifically, in the image analysis, a determination is made as to the type/status of a vehicle is made such that the contour the vehicle is first detected, and a determination as to whether the vehicle is, for example, a large-size vehicle bc. A determination is also made as to the position of that vehicle relative to the position of the vehicle mc by detecting the position of the large-size vehicle bc relative to a white line drawn on a road or relative to the side edge of the road.

Figure 14:
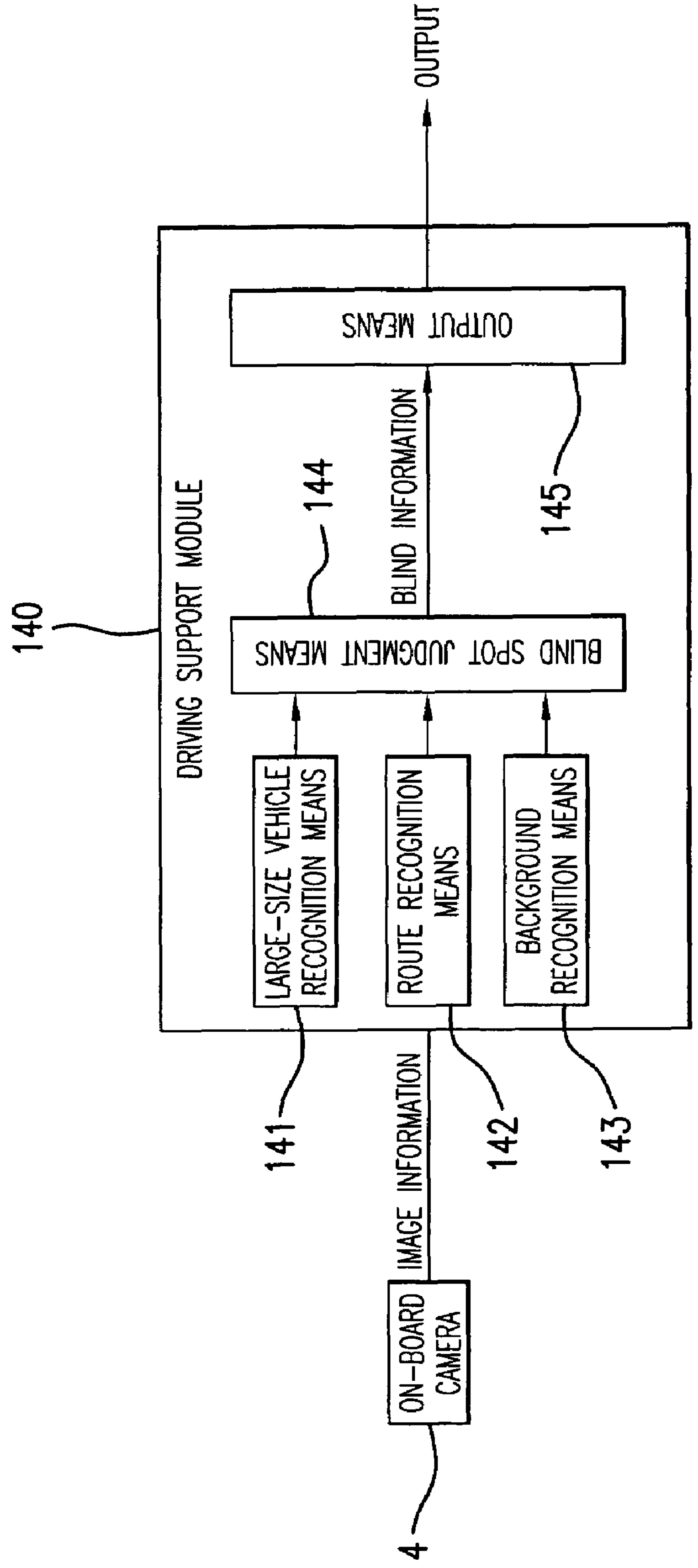
FIG. 14 is a block diagram of a driving support module that makes a judgment in terms of a blind spot.

FIG. 14 shows a construction of a driving support module 140 that detects a blind spot. Image information output from the on-board camera 4 is supplied to the driving support module 140. The driving support module 140 includes large-size vehicle recognition means 141, route recognition means 142, background recognition means 143, and blind spot judgment means 144. The blind spot judgment means 144 determines whether there is a blind spot that cannot be seen by the driver, based on information supplied from the large-size vehicle recognition means 141, the route recognition means 142, and the background recognition means 143. If the blind spot judgment means 144 determines that there is a blind spot caused by the presence of a large-size vehicle, blind spot information associated with the blind spot is supplied to output means 145 for output.

The large-size vehicle recognition means 141 makes the judgment as to whether the vehicle is a large-size vehicle based on the edge-to-edge dimension of the vehicle on a horizontal line or a vertical line. Furthermore, the large-size vehicle recognition means 141 extracts a candidate for an image of a large-size vehicle, and compares, using a pattern recognition technique, the contour of the extracted candidate with an image of a large-size vehicle prestored in storage means. If there is good similarity, it is determined that the vehicle is of the large size.

The route recognition means 142 makes a judgment as to the direction of a road by recognizing a white line drawn in the center of the route, and a step, a guard rail, and/or the like are detected based on side edges of the road whose direction is determined based on the direction of the white line. If there is a large-size vehicle parked or stopped on the road, the image of the side edge extending the same direction as the direction of the road is interrupted by the image of the large-size vehicle, and thus it is possible to distinguish the road from the large-size vehicle.

The background recognition means 143 makes a judgment to distinguish the large-size vehicle and the road from the other parts of the background.

When the blind spot judgment means 144 detects a large-size vehicle present in the driver's field of view, the blind spot judgment means 144 determines that there is a blind spot behind the large-size vehicle.

In addition to the capability of detecting a blind spot in the above-described manner, the driving support module 140 also has the capability of evaluating, using the blind spot judgment means 144, the visibility to the driver of the route ahead, based on the image of the road detected by the route recognition means 142. For example, the blind spot judgment means 144 evaluates the visibility at an intersection cr or a corner C from locations, sizes, and/or other features of houses or buildings located close to the intersection cr or the corner C. More specifically, in the example shown in FIG. 8, the blind spot judgment means 144 determines whether the driver can see (have a clear view of) a road crossing the driver's route at an intersection. In the example shown in FIG. 10, the blind spot judgment means 144 determines whether the driver can see that portion of road extending ahead of the corner C.

Based on the detected situation, the visibility in the driver's field of the view is judged. More specifically, for example, when the image of the view includes a building, a tree, or the like that hides a portion of a road ahead in the image, the blind spot judgment means 144 determines that the visibility is poor. On the other hand, when there is no such building, tree or the like hiding a portion of a road ahead, e.g. The driver's route or a road intersecting same, the blind spot judgment means 144 determines that the visibility is good. The determination as to the visibility is included in the blind spot judgment. In the driving support system 100 according to the present invention, the driving support module 140 is disposed in first judgment means 111, second judgment means 112, fourth judgment means 114, or fifth judgment means 115, all of which are incorporated into the warning point judgment unit 110, thereby providing the capability of detecting a blind point caused by the presence of a large-size vehicle, judging the visibility at an intersection, and/or judging the visibility at a corner.

As described earlier, the navigation ECU 1 is connected to the vehicle ECU 5 (the electric control unit that controls the running of the vehicle mc in accordance with commands issued by the driver) such that the navigation ECU 1 can acquire, from the vehicle ECU 5, information indicating activation of a right-turn or left-turn blinker of the vehicle mc and/or information indicating the running speed of the vehicle mc. This makes it possible for the navigation ECU 1 to determine from the supplied information whether the vehicle mc is going to turn to the left or right. Such information associated with the vehicle mc is referred to herein as "vehicle status information".

The navigation ECU 1 is also connected to the communication unit 6 for vehicle-to-vehicle communication and/or station-to-vehicle communication to acquire information associated with other vehicles oc and/or roads.

More specifically, for example, when the vehicle mc is going to enter an intersection cr, if there is another vehicle oc approaching the same intersection cr on another road, information indicating the road from which the vehicle oc is approaching the same intersection cr, information indicating the location of the vehicle oc, and/or information indicating the approaching speed of the vehicle oc are obtained by the communication unit 6. When the vehicle mc is approaching a corner C, if there is another vehicle oc approaching the same corner C from the opposite direction, information indicating the location of the other vehicle oc and/or information indicating the approaching speed of the vehicle oc are obtained by the communication unit 6. In the present invention, information associated with other vehicles oc and/or roads is referred to as "traffic information".

Based on information supplied by the GPS receiver 7 in the current position detector 8, it is possible to determine the location of the vehicle mc and also the "current time". That is, the current position detector 8 serves as vehicle position detection means.

Navigation ECU 1

The navigation ECU 1 is a key component of the driving support system according to the present invention, and includes, as shown in FIG. 1, a navigation unit 10 for searching for a navigation route and displaying the determined navigation route and also includes a warning processor 11 for execution of a warning routine, which warning processor and routine are features of the present invention.

1. Navigation Unit 10

The navigation unit 10 is an essential component of the on-board navigation apparatus which provides navigational guidance to a destination. The navigation unit 10 includes navigation route searching means 101 for searching for a navigation route to a destination and navigation image information generation means 102 that compares the navigation route supplied from the navigation route searching means 101 with information indicating the current location of the vehicle mc and/or direction information supplied from the current position detector 8, and that, based on the results of the comparison, generates image information necessary for navigation (navigational guidance to the destination, facilities en route to the destination, etc.). For example, the navigation image information may be displayed as a highlighted navigation route on a map, with an arrow displayed to indicate the navigational direction, depending on the location of the vehicle on the navigation route. Thus, the driving support system 100 recognizes the navigation route to the destination and uses it in the process of determining whether or not to give a warning.

2. Warning Processor

The warning processor is a unit that automatically executes a driving support routine (warning process), which is a feature of the present invention, to give a warning to the driver in the form of a virtual image.

In one embodiment of the present invention, by way of example, the system 100 has the capability of giving five different types of warnings (the capability of performing first to fifth judgments). However, the warnings are not limited to these five types, rather, less than five of these types of warnings, any combination of these types, and/or other types of warnings may also be used.

In the present invention, virtual images are displayed in various manners, depending on the result of judgments, as described in detail below.

1. First Judgment

Figure 2A:
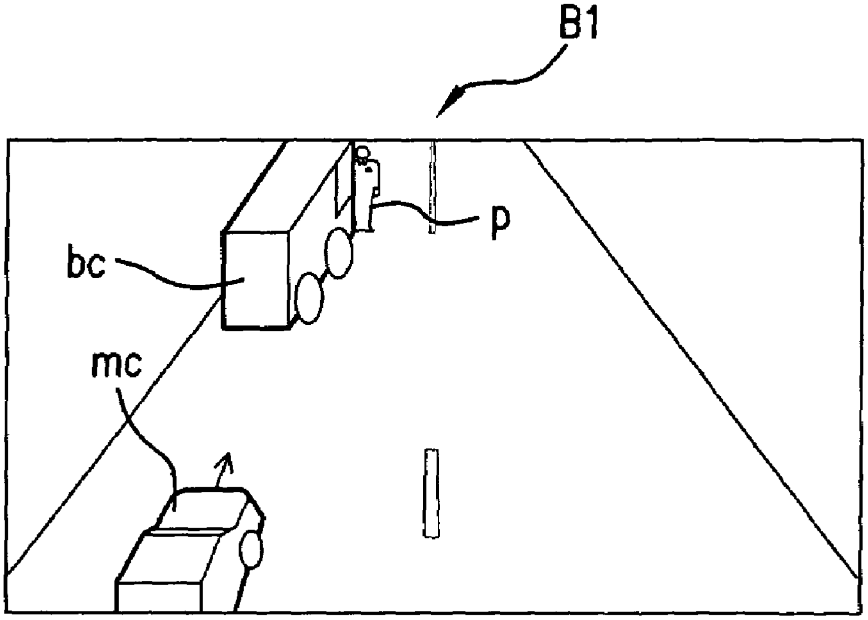
FIGS. 2A and 2B show images displayed on the display means wherein the vehicle is running straight.
Figure 2B:
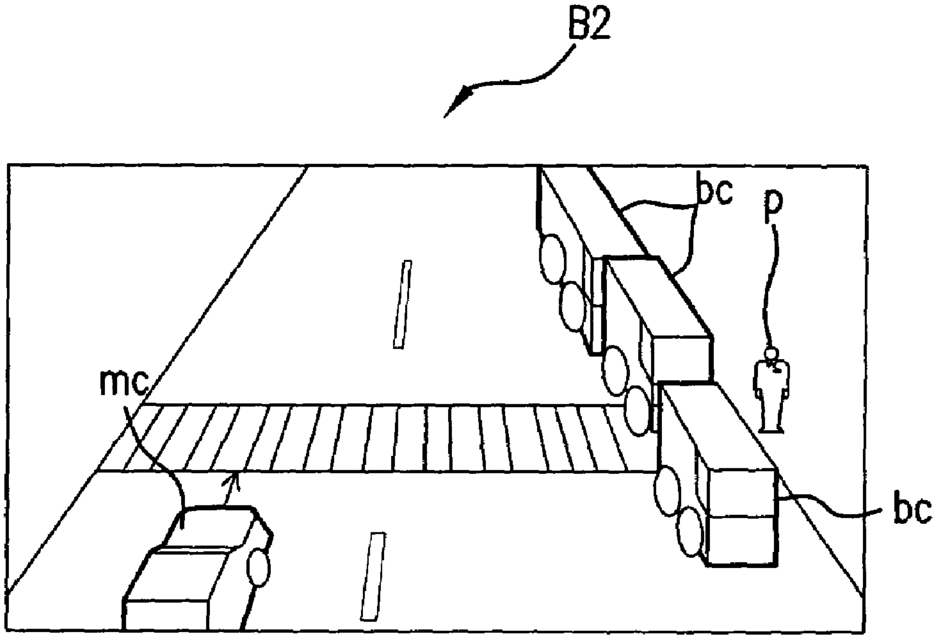

The first judgment is made by the first judgment means 111. When the judgment indicates that a warning should be given, a virtual image of a blind spot with pedestrian p therein is displayed, e.g. a blind spot hidden by a large-size vehicle bc present in the driver's field of view (FIGS. 2A and 2B).

2. Second Judgment

Figure 4A:
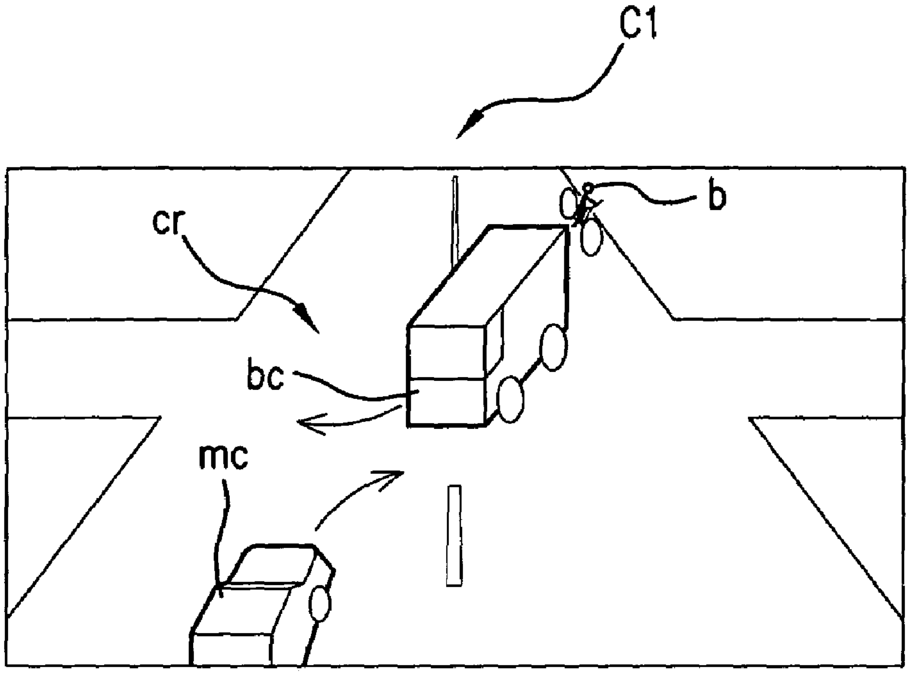
FIGS. 4A and 4B are diagrams showing images displayed on the display means wherein the vehicle is turning to the right.
Figure 4B:
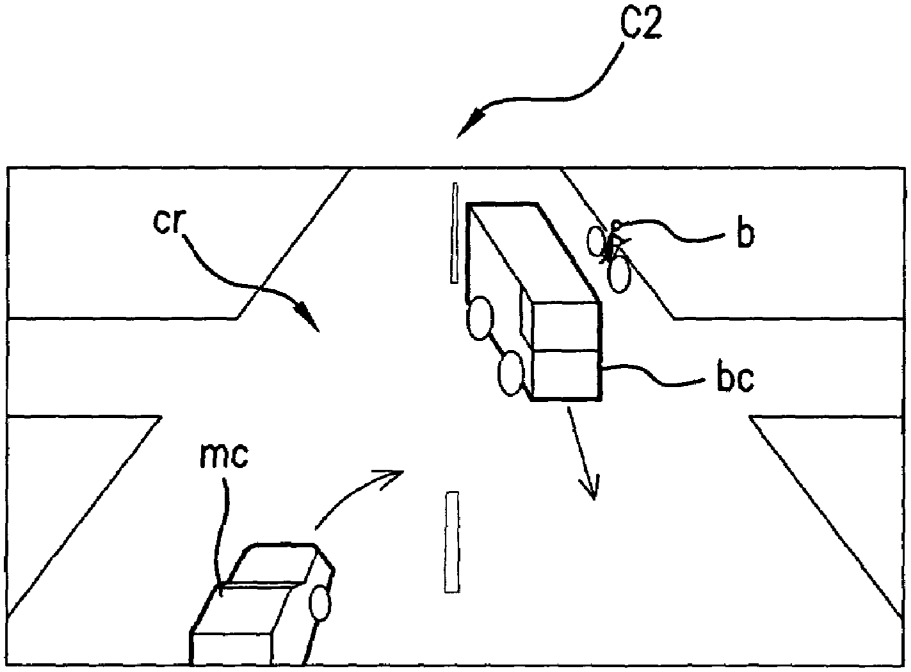

The second judgment is made by the second judgment means 112. When the judgment indicates that a warning should be given, the warning is in the form of a virtual image of a motorcycle b in a blind spot hidden by a large-size vehicle bc present in the driver's field of view (FIGS. 4A and 4B).

3. Third Judgment

Figure 6:
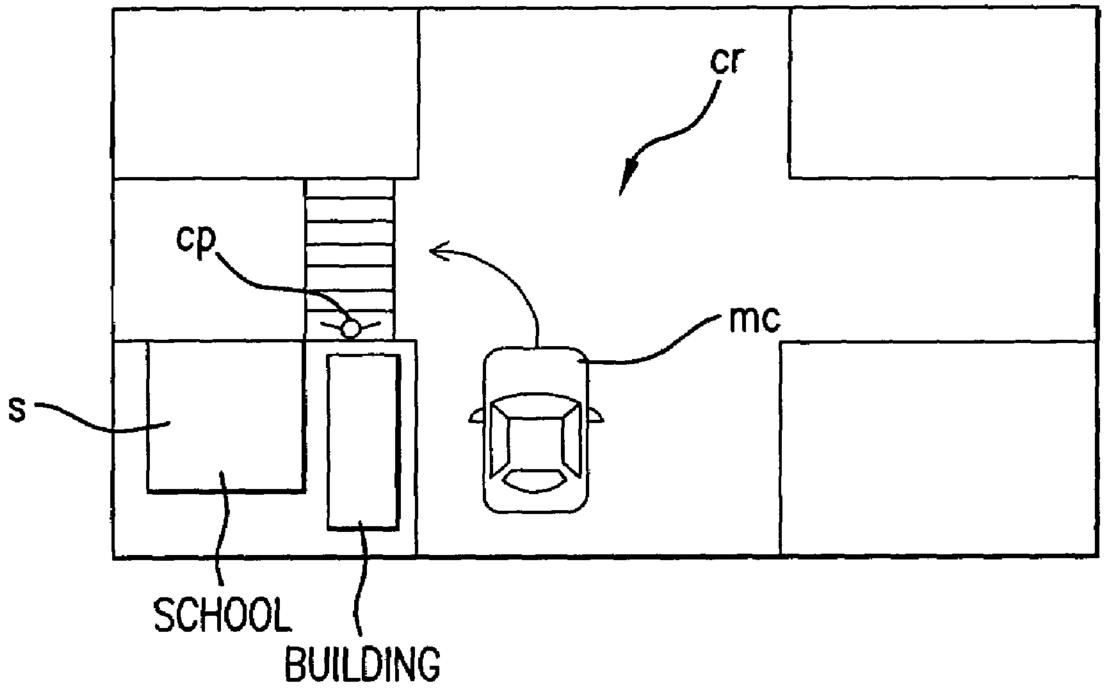
FIG. 6 is a diagram showing an image displayed on the display means wherein the vehicle is turning to the left.

The third judgment is made by the third judgment means 113. When it is determined that there is a likelihood (alternatively, a possibility) of the presence of a pedestrian p in a pedestrian crossing which the vehicle mc is approaching, a virtual image of a pedestrian p is displayed (FIG. 6).

4. Fourth Judgment

Figure 8:
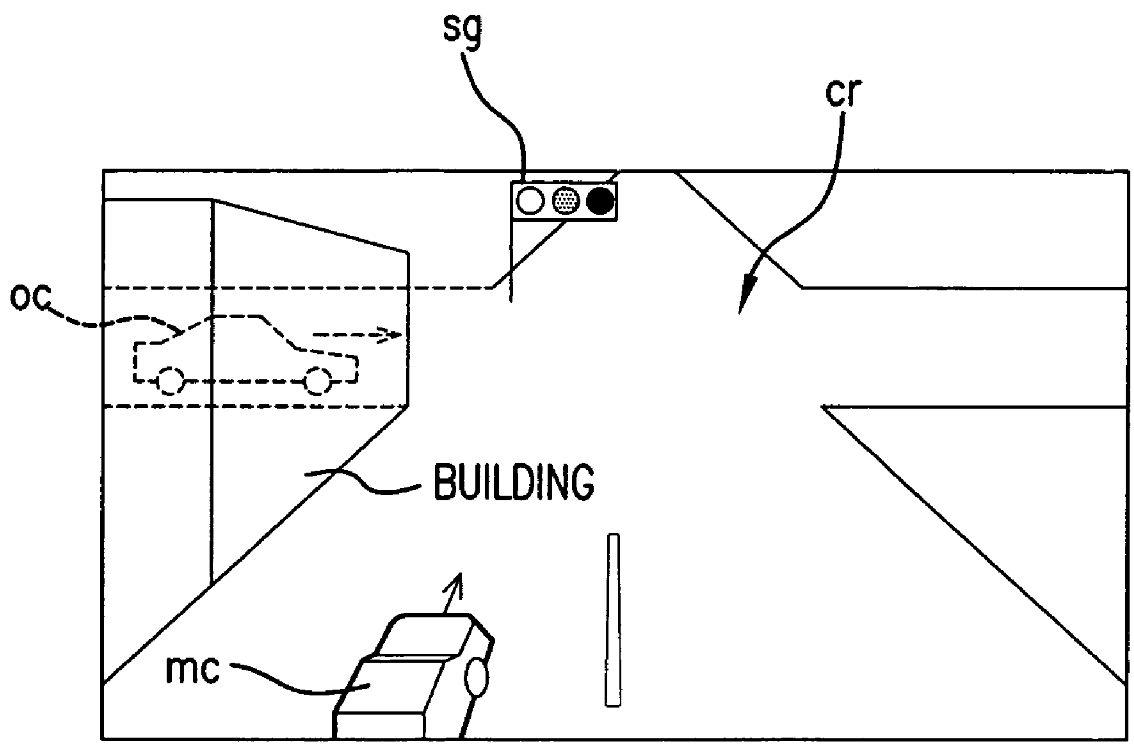
FIG. 8 is a diagram showing an image displayed on the display means wherein a vehicle is approaching an intersection.

The fourth judgment is made by the fourth judgment means 114. When the judgment indicates that a warning should be given in advance of entry of the vehicle into an intersection, the warning is in the form of a display of a virtual image of the intersection and a traffic signal sg. A virtual image of another vehicle oc may also be displayed as shown in FIG. 8.

5. Fifth Judgment

Figure 10:
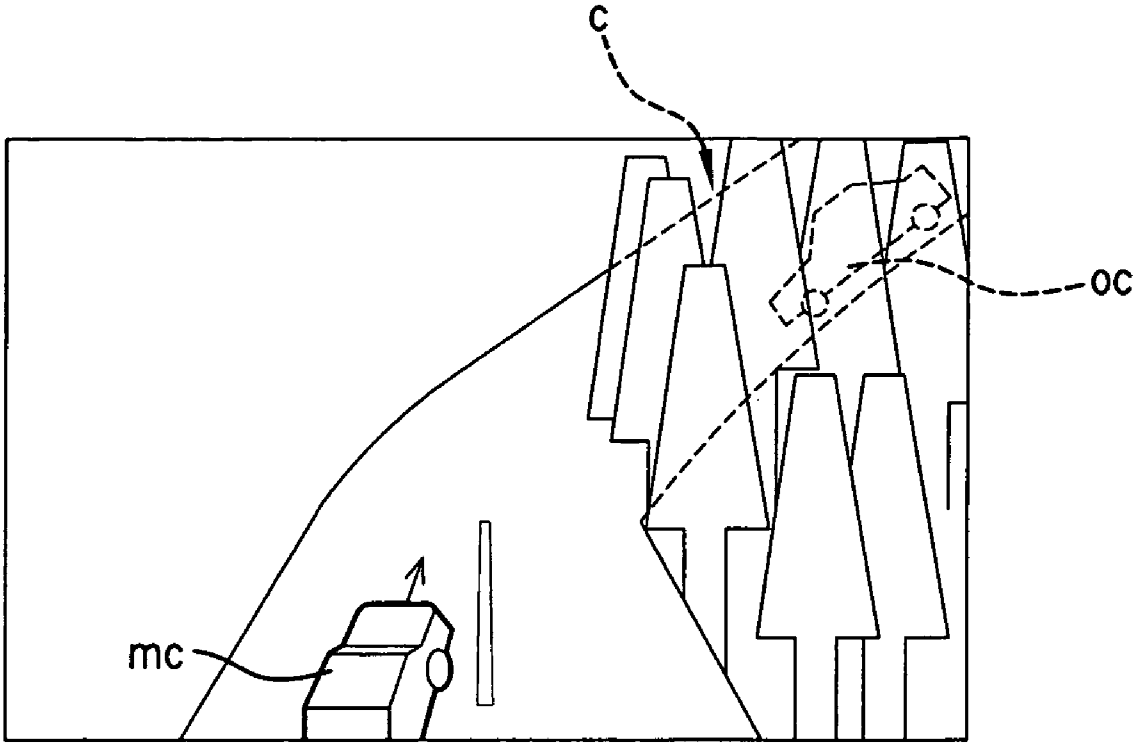
FIG. 10 is a diagram showing an image displayed on the display means wherein the vehicle is approaching a corner.

The fifth judgment is made by the fifth judgment means 115. When there is poor visibility in the driver's field of view where the vehicle is approaching a turn around a corner C, a virtual image of the corner C is displayed. When there is a vehicle oc coming from the opposite direction, a virtual image of the approaching vehicle oc is also displayed (FIG. 10).

The warning processor 11 includes the warning point judgment unit 110 that makes the judgments described above and also includes warning image information generation means 120 that is arranged to operate at a stage following the warning point judgment unit 110 and that serves to generate virtual image information, depending on the type of warning to be given. The warning image information generation means 120 generates different virtual image information depending on the type of a warning determined to be given by the judgment means 111, 112, 113, 114, or 115, incorporated into the warning point judgment unit 110. For example, if the first judgment means 111 determines that a warning should be given, virtual image information (a virtual image of a pedestrian p behind a large-size vehicle bc) corresponding to the judgment is generated. Depending on the type of judgment, virtual object image information is read from a database iDB stored in the information storage unit 3, and the virtual object image information is used in the generation of the virtual image information. More specifically, a pedestrian p is read responsive to a positive first or third judgment, and a motorcycle p is read responsive to a positive second judgment. A traffic signal sp and another vehicle oc are read responsive to a positive fourth judgment, and a corner shape C and another vehicle oc are read responsive to a positive fifth judgment.

The generated virtual image information is converted to a display on the display unit 2.

Details of Judgments

The judgments made by the respective judgment means 111, 112, 113, 114, and 115, and the image information generated by the warning virtual image generation means 120, depending on the type of a warning determined to be given, are described in further detail below.

In the following discussion, for the purpose of simplicity, it is assumed that generation of virtual image information is performed only once.

FIGS. 2 to 11 serve to illustrate the manner in which the respective judgments are made. FIGS. 13A-13E are flowcharts summarizing the judgment processes. With reference to these flowcharts, the respective judgment routines are described below. Note that in the following description associated with the flow charts, steps are denoted by symbols in the form of "S-numeral-numeral" where the first numeral indicates a judgment number assigned to each judgment routine, and the second numeral indicates the step number in each judgment routine.

1. First Judgment

The first judgment is made repeatedly by the first judgment means 111 as the vehicle mc travels along the determined route ("navigational route"), as shown in FIGS. 2A and 2B. In the example shown in FIG. 2A, there is a large-size vehicle bc parked or stopped at a location in the same lane as that in which the vehicle mc is traveling, and there is the possibility of a pedestrian p suddenly appearing from behind the large-size vehicle. In the example shown in FIG. 2B, ahead of the vehicle mc in an opposing lane, are a plurality of large-size vehicles bc that are in a gridlock or are parked, and again there is the possibility of the presence of a pedestrian p in a pedestrian crossing ahead of the vehicle mc and the pedestrian, if present, might suddenly appear from between the large-size vehicles bc. In this case, a virtual image of a pedestrian p is displayed, as a "virtual object" according to the present invention, on a virtual screen.

In these examples, the "blind spot judgment" and the "speed judgment" according to the present invention are made using image information supplied from the on-board camera 4 and from vehicle status information including information indicating the running speed of the vehicle.

Figure 3:
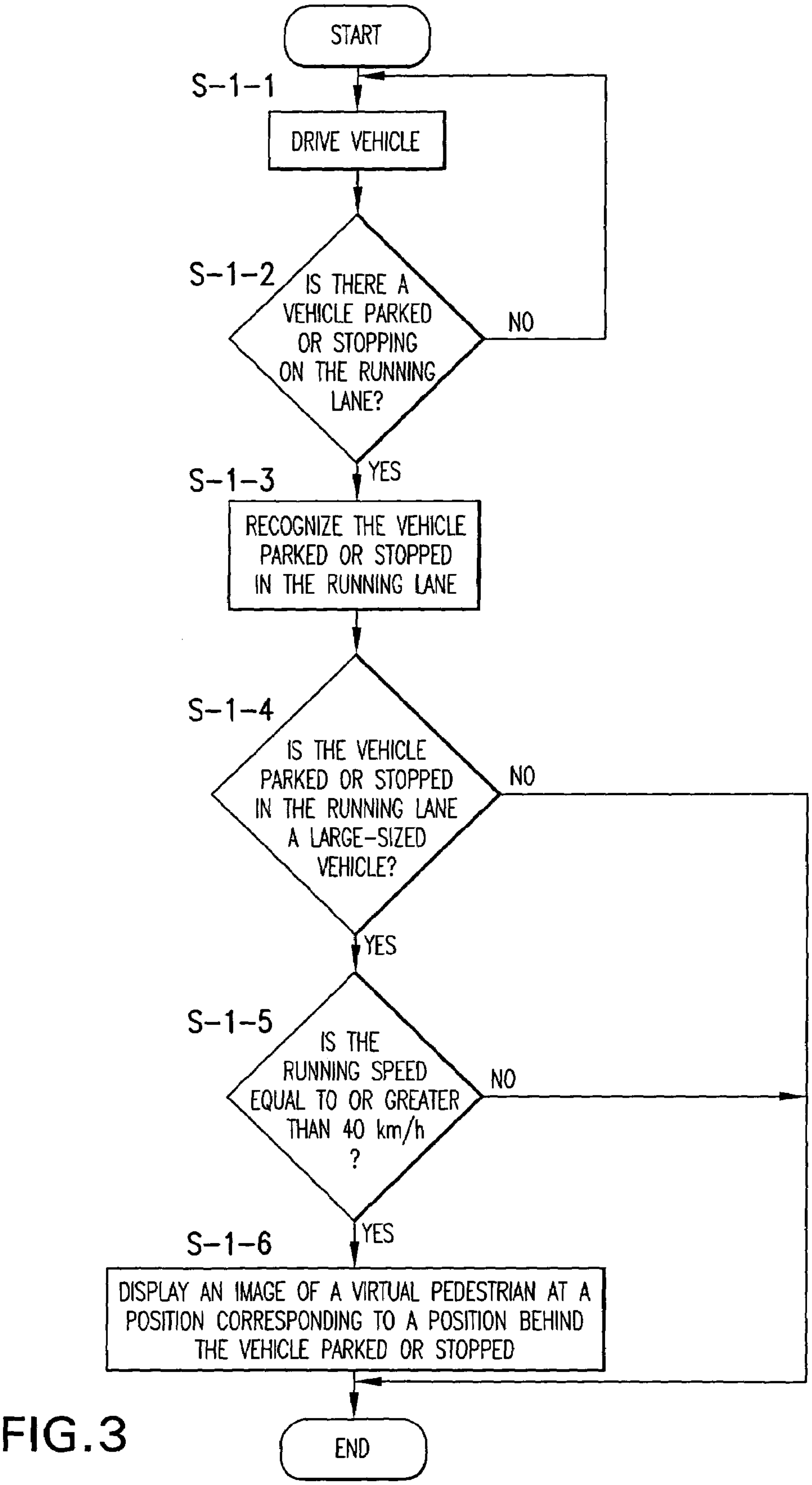
FIG. 3 is a flow chart of a process for producing a virtual image as shown in FIG. 2A or 2B.

First Judgment Process (FIG. 3)

In step S-1-1, the vehicle is running.

(A) Main Judgment Routine

In step S-1-2, it is determined from an image taken by the on-board camera 4 whether or not, within a predetermined distance (for example, within a distance of 200 m) ahead of the vehicle mc, there is a vehicle c that is parked or stopped in the same lane as that in which the vehicle mc is traveling.

In step S-1-3, image recognition is executed to recognize the vehicle c that is parked or stopped in the same lane as that in which the vehicle mc is traveling.

In step S-1-4, it is determined whether the vehicle c, which is parked or stopped, is a large-size vehicle bc, based on the results of the image recognition.

As used herein "large-size vehicle bc" refers to a large vehicle such as a bus, a truck, or the like.

In step S-1-5, it is determined whether the vehicle ms is running straight at a speed equal to or greater than a predetermined speed (for example, 40 km/h).

(B) Production of Virtual Image Information

In step S-1-6, if it is determined that the vehicle c parked or stopped in the opposite lane is a large-size vehicle bc and if it is determined that the speed of the vehicle mc is equal to or greater than the threshold value (40 km/h), then image information is generated so as to include a virtual image of a pedestrian p or the like located in an area corresponding to a blind spot behind the large-size vehicle bc. Note that the determination as to whether such virtual image information should be generated and displayed is made so that such virtual image information is not unnecessarily generated and displayed. The virtual image may be displayed such that a blind spot is indicated by an enclosing frame or by display of a warning mark. In the case in which a pedestrian p present in a blind area is detected by person-to-vehicle communication, it is preferred to display an image indicating the presence of an actual pedestrian p or to give a warning indicating that there actually is a pedestrian p in the blind spot area, instead of displaying a virtual image.

2. Second Judgment

The second judgment is made by the second judgment means 112. This judgment is made, as shown in FIGS. 4A and 4B, when the vehicle mc is to turn to the right at an intersection cr.

In the example shown in FIG. 4A, when the vehicle mc is to turn to the right at an intersection cr, a large-size vehicle bc is to turn to the right at the same intersection cr from an opposing lane, and there is the possibility that a motorcycle b or the like may suddenly appear from behind the large-size vehicle. In the example shown in FIG. 4B, a large-size vehicle bc is passing straight through an intersection cr and there exists the possibility that a motorcycle b or the like may suddenly appear from behind the large-size vehicle bc. In this case, a virtual image of the motorcycle b is displayed as a "virtual object" on the virtual screen.

In these examples, "blind spot judgment" and "speed judgment" according to the present invention are executed using image information supplied from the on-board camera 4 and vehicle status information including information indicating the running speed of the vehicle mc.

The judgment routine is illustrated by the flowcharts shown in FIGS. 5, and 13(A)-13(E).

The judgment routine is divided into two parts: the first part including steps S-2-1 to S-2-8 for a preliminary judgment; and the second part for a main judgment including steps following steps S-2-8. In the second part, "blind spot judgment" and "speed judgment" are performed in a manner similar to the first judgment described above, to determine whether or not it is necessary to give a warning, depending on whether there is a blind spot and also depending on the detected speed of the vehicle mc.

Figure 13A:
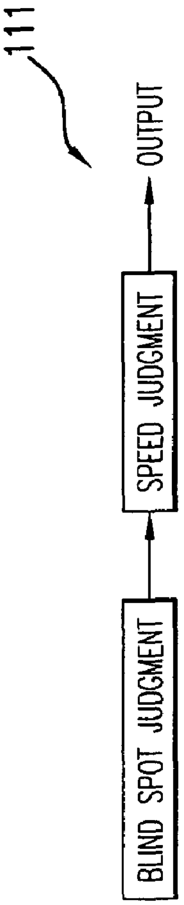
FIGS. 13(*a*) to 13(*e*) are flowcharts of processing associated with respective judgments.
Figure 13B:
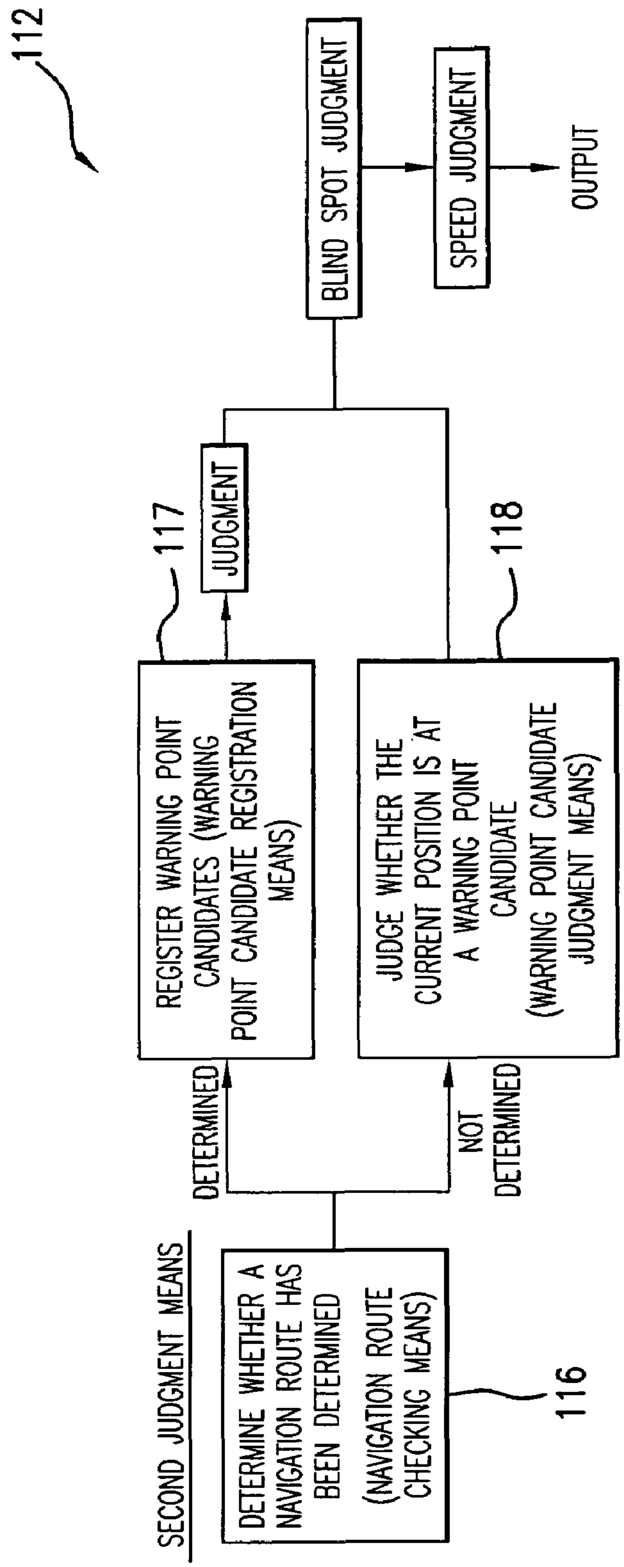

In the judgment as shown in FIG. 13(B), navigation route checking means 116 checks if a navigation route has been determined, and then the steps which follow are selectively executed, depending on the result of the check, i.e. by warning point candidate registration means 117 and warning point judgment means 118. More specifically, in the case in which a navigation route has been determined, the warning point candidate registration means 117 extracts points ("candidate warning points") having a high probability of need to give a warning, and registers in advance the extracted points so that it is sufficient to execute the following judgment routine only when the vehicle mc reaches one of the registered candidate warning points. On the other hand, when no navigation route has been determined, the warning point judgment means 118 is activated to determine whether the vehicle is in a situation which indicates a need for further execution of the main judgment routine.

The determination as to whether a certain point is a candidate warning point is made, as shown in FIGS. 4A and 4B, by judging whether the point is a right turn intersection cr.

Figure 5:
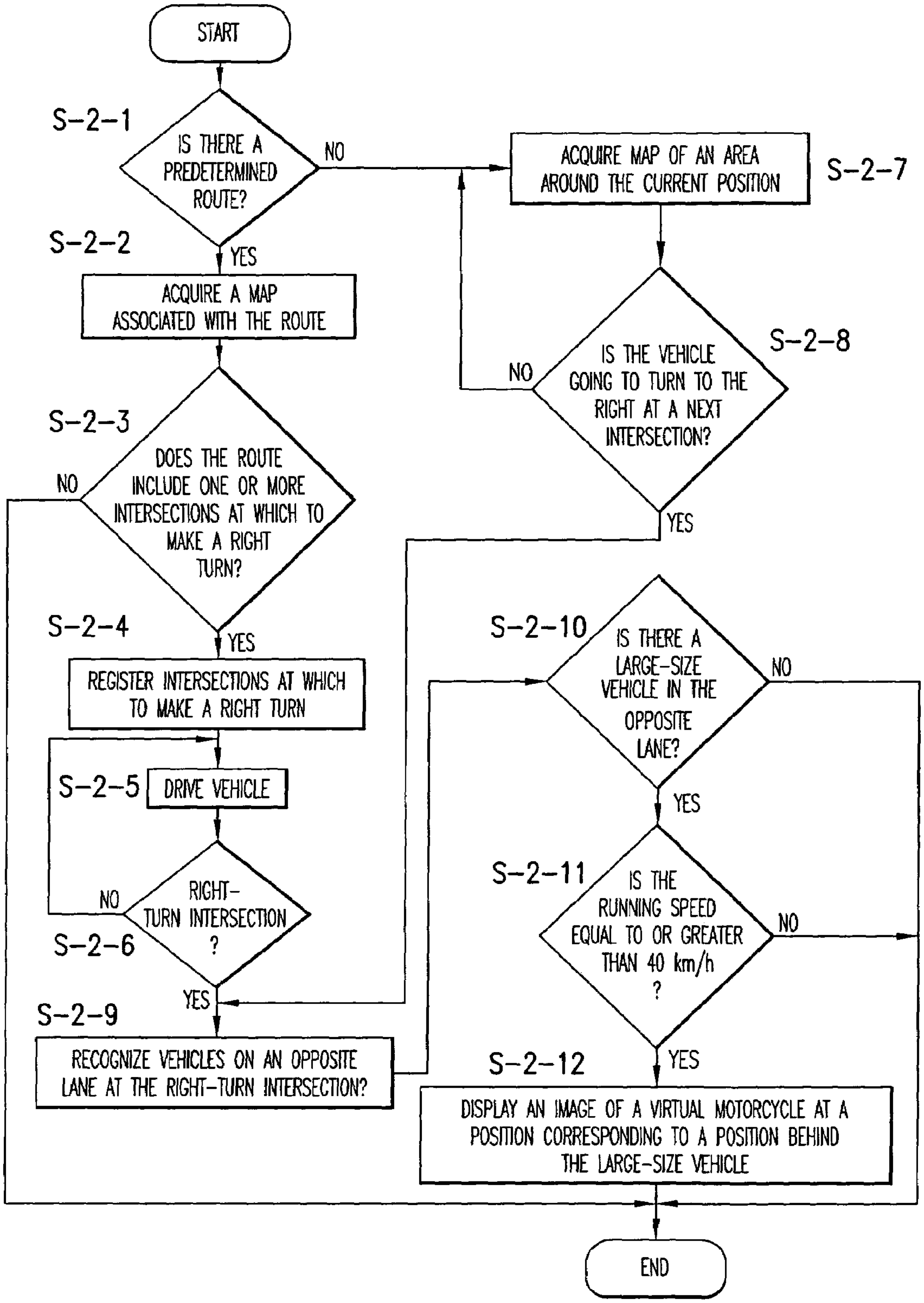
FIG. 5 is a flow chart of a process for producing a virtual image as shown in FIG. 4A or 4B.

Second Judgment Process (FIG. 5)

(B) Preliminary Judgment

In step S-2-1, the navigation route checking means 116 checks whether or not a navigation route has been determined.

When a navigation route has been determined, the warning point candidate registration means 117 executed the routine described above, and, in the following steps, the "blind point judgment" and the "speed judgment" are executed only at candidate warning points, in the manner described below.

In step S-2-2, navigation route information (a map) indicating a route to a destination is acquired.

In step S-2-3, it is determined, based on the acquired navigation route information, whether or not the navigation route information includes one or more intersections cr at which to make a right turn is to be made.

In step S-2-4, detected crossings cr at which a right turn is to be made are registered in advance as memorized points (particular points registered in memory).

In step S-2-5, the vehicle is running.

In step S-2-6, it is determined whether or not the vehicle mc has reached one of the registered intersections cr at which to make a right turn. If so, the following judgment routine is executed, but otherwise, driving of the vehicle without issuance of a warning is continued.

When no navigation route has been determined, the warning point judgment means 118 continues to monitor whether the vehicle has reached a point at which the "blind point judgment" and the "speed judgment" should be executed. Note that only when the warning point judgment means 118 determines that such judgments are needed, are the judgments executed.

In step S-2-7, when no navigation route has been determined, map information of an area around (in the vicinity of) the current location is acquired.

In step S-2-8, when the vehicle mc is approaching an intersection cr, a determination is made as to whether the vehicle is going to turn to the right at that intersection cr, based on the vehicle status information, specifically the status of blinkers and/or information indicating whether the vehicle mc is in a right-turn lane.

(B) Main Judgment Process

In the main judgment process thereafter executed, because it has already been determined that the vehicle is going to make a right turn at intersection cr, the main judgment can be made in a manner similar to the first judgment described earlier, and as further described below.

In step S-2-9, it is determined, using the on-board camera 4, whether there is a vehicle c approaching the intersection cr, at which the vehicle mc is going to make a right turn, from the opposite direction. Opposing lanes in sight are continuously monitored for the presence of such a vehicle.

In step S-2-10, image recognition is executed to determine whether there is a large-size vehicle bc in an opposing lane.

In step S-2-11, it is determined from the speed information whether the vehicle mc is going to turn to the right at a speed equal to or greater than a predetermined threshold value (for example, 40 km/h).

In step S-2-12, if there is a large-size vehicle c in an opposing lane and the speed of the vehicle mc is equal to or greater than the threshold value (40 km/h), image information is generated which includes a virtual image of a motorcycle b or the like, located in an area corresponding to the blind spot behind the large-size vehicle bc. Note that the determination as to whether such virtual image information should be generated and displayed is made preliminarily so that virtual image information is not unnecessarily generated and displayed.

Preferably, the virtual image is displayed, as with the first judgment described earlier, such that the blind area is highlighted by being surrounded by a frame or by display of a warning mark or the like. In a case in which the actual presence of a vehicle such as a motorcycle in the blind spot can be detected by vehicle-to-vehicle communication or a road-to-vehicle communication, an image of the actual vehicle may displayed instead of the virtual image, or a warning indicating the actual presence of a vehicle in the blind spot may be given.

The virtual image and an image indicating an actual vehicle or the like may be distinguished, for example, such that the virtual image is drawn by dotted lines but the image indicating the actual presence of a vehicle is drawn by solid lines, or the virtual image may be a blinking image, while the image indicating the actual presence of a vehicle is continuously displayed.

3. Third Judgment

The third judgment is made by the third judgment means 113. This judgment is made when the vehicle mc is to turn to the left at an intersection cr, as shown in FIG. 6.

In the example shown in FIG. 6, the vehicle mc is going to turn to the left at the intersection cr, and there is a pedestrian crossing extending across the road onto which the vehicle mc is going to turn. Furthermore, there is also a school s facing the road onto which the vehicle mc is going to turn. Thus the situation is that a pedestrian cp may suddenly walk into the road with the intention of crossing at the pedestrian crossing.

Accordingly, a virtual image of a pedestrian cp is displayed as a virtual object according to the present invention on the virtual screen.

In this specific example, the "event judgment", the "time judgment", and the "speed judgment", according to the present invention are executed using map information acquired from the map database mDB, time information indicating the current time, and the vehicle status information.

Figure 7:
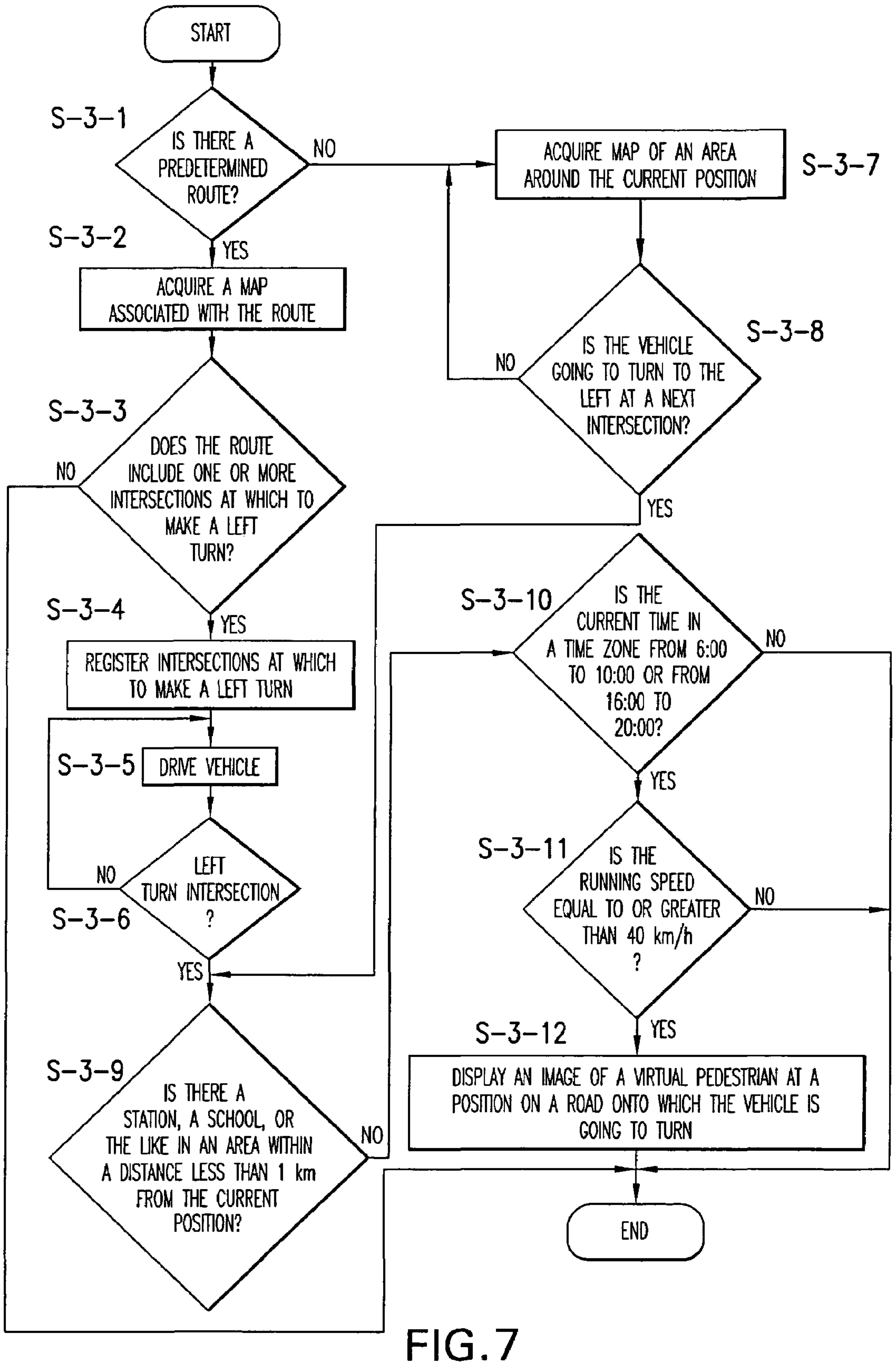
FIG. 7 is a flow chart of a process for producing a virtual image as shown in FIG. 6.

A flowchart of a routine for making these judgments is shown in FIG. 7.

Figure 13C:
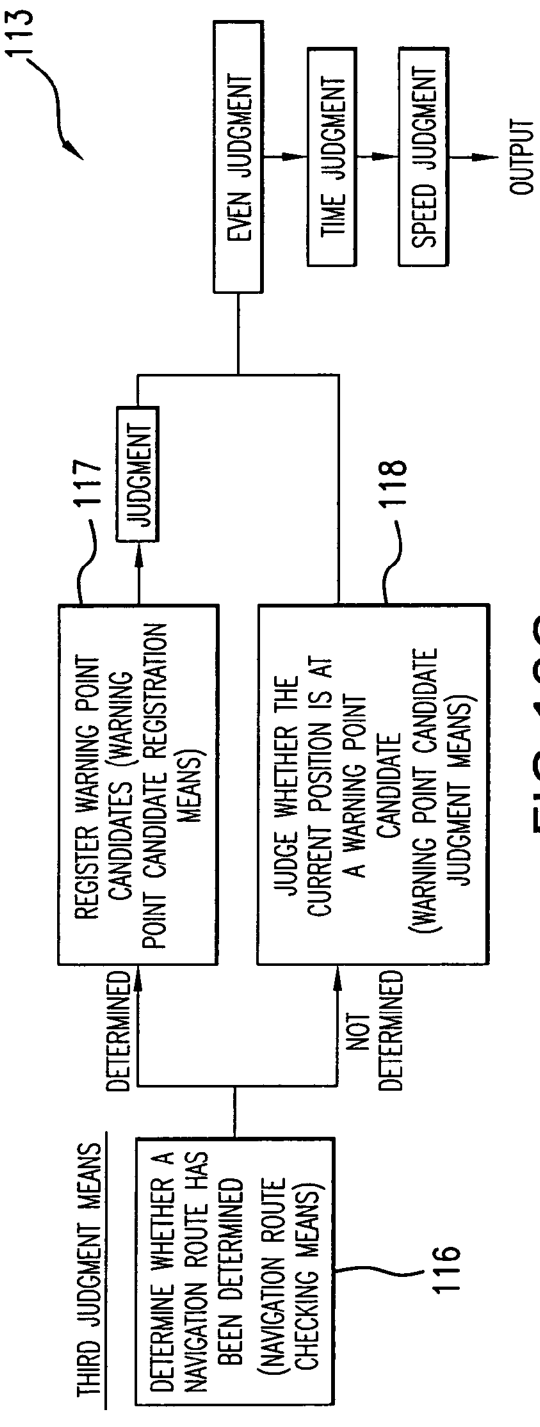

As with the second judgment described earlier, after a preliminary judgment is made in steps S-3-1 to S-3-8, the main judgment routine comprising the following steps is executed. In the preliminary judgment, it is determined whether the vehicle mc has approached near an intersection cr at which a left turn is to be made. In the main judgment routine, as shown in FIG. 13(C), the "event judgment", the "time judgment", and the "speed judgment" are made in accordance with the present invention. If the results of these judgments indicate that a pedestrian cp may walk into a road onto which the vehicle mc is to turn, a virtual image of a pedestrian cp is displayed as a virtual object (FIG. 6).

The preliminary judgment part of the routine is performed in a similar manner to the second judgment described above, except for the difference in the determination criterion, the navigation route checking means 116, the warning point candidate registration means 117, and the warning point judgment means 118.

Third Judgment (FIG. 7)

(A) Preliminary Judgment

In step S-3-1, the navigation route checking means 116 checks whether a navigation route has been determined.

When a navigation route has been determined, the warning point candidate registration means 117 executes the process described below.

In step S-3-2, navigation route information (a map) indicating a route to a destination is acquired.

In step S-3-3, it is determined, based on the acquired navigation route information, whether the navigation route information includes one or more intersections cr at which a left turn is to be made.

In step S-3-4, detected intersections cr at which a left turn is to be made are registered in advance as memorized points.

In step S-3-5, the vehicle is running.

In step S-3-6, it is determined whether the vehicle mc has reached one of the registered intersections cr at which to make a left turn. If so, the following judgment routine is executed, but otherwise, driving of the vehicle is continued uninterrupted.

When no navigation route has been determined, the warning point judgment means 118 executes the steps described below.

In step S-3-7, when no navigation route has been determined, map information for an area surrounding the current location is acquired.

In step S-3-8, when the vehicle mc is approaching an intersection cr, a determination is made as to whether the vehicle is going to turn to the left at the intersection cr, based on the vehicle status information, specifically the status of blinkers and/or information indicating whether the vehicle mc is in a left-turn lane.

(B) Main Judgment

In the main judgment portion of the routine, the "event judgment", the "time judgment", and the "speed judgment" are executed.

Event Judgment

In step S-3-9, it is determined, based on the map database mDB, whether there is a station or a school within a predetermined range (for example, 1 km) from the intersection cr.

The event judgment means judges, based on map information, whether there is an event or factor of which the driver should be made aware.

Time Judgment

In step S-3-10, it is determined from the GPS time information or vehicle time information whether the current time is within a predetermined time zone (for example, from 6:00 am to 10:00 am or from 16:00 pm to 20:00 pm).

Speed Judgment

In step S-3-11, it is determined from the speed information whether the vehicle mc will turn to the left at a speed equal to or greater than a predetermined threshold value (for example, 40 km/h).

(C) Production of Virtual Image Information

In step S-3-12, if it is determined that the vehicle mc is to turn to the left at a speed equal to or greater than the predetermined threshold value (km/h) at an intersection cr and in a particular time zone, image information is generated which includes a virtual image of a pedestrian cp in or near the section of road onto which the vehicle mc is going to turn. Note that the preliminary determination as to whether such virtual image information should be generated and displayed is made so that virtual image information is not unnecessarily generated and displayed.

Instead of displaying a virtual image of the pedestrian cp, a blind spot may be indicated by enclosing the blind spot by a frame or by displaying a warning mark. In a case in which the actual presence of a vehicle present in a blind spot is detected by a vehicle-to-vehicle communication or a road-to-vehicle communication, it is desirable to display an image indicating the actual presence of a vehicle or to give a warning indicating that a vehicle is actually present in the blind spot, instead of displaying the virtual image.

The virtual image and the image indicating the actual presence of a vehicle or the like may be distinguished, for example, by representing the virtual image with dotted lines, while indicating the actual presence of a vehicle with solid lines, or the virtual image may be a blinking image while the image indicating the actual presence of a vehicle is continuously displayed, as in the previous example.

4. Fourth Judgment

The fourth judgment is made by the fourth judgment means 114 when the vehicle mc is about to enter an intersection cr, to determine whether there is another vehicle oc also about to enter the same intersection cr, as shown in FIG. 8. This judgment is useful when the vehicle mc entering an intersection cr at which no traffic signal sg is installed, to warn the driver of the possibility that another vehicle oc is also about to enter the intersection cr.

Thus, a virtual image of a traffic signal sg is displayed as a virtual object according to the present invention on the virtual screen.

In this example, "visibility judgment" (which can be regarded as a type of blind spot judgment) and "event judgment" are executed according to the present invention, using image information supplied from the on-board camera 4, traffic information acquired by vehicle-vehicle communication, and vehicle status information indicating the current location and the speed of the vehicle mc.

Figure 9:
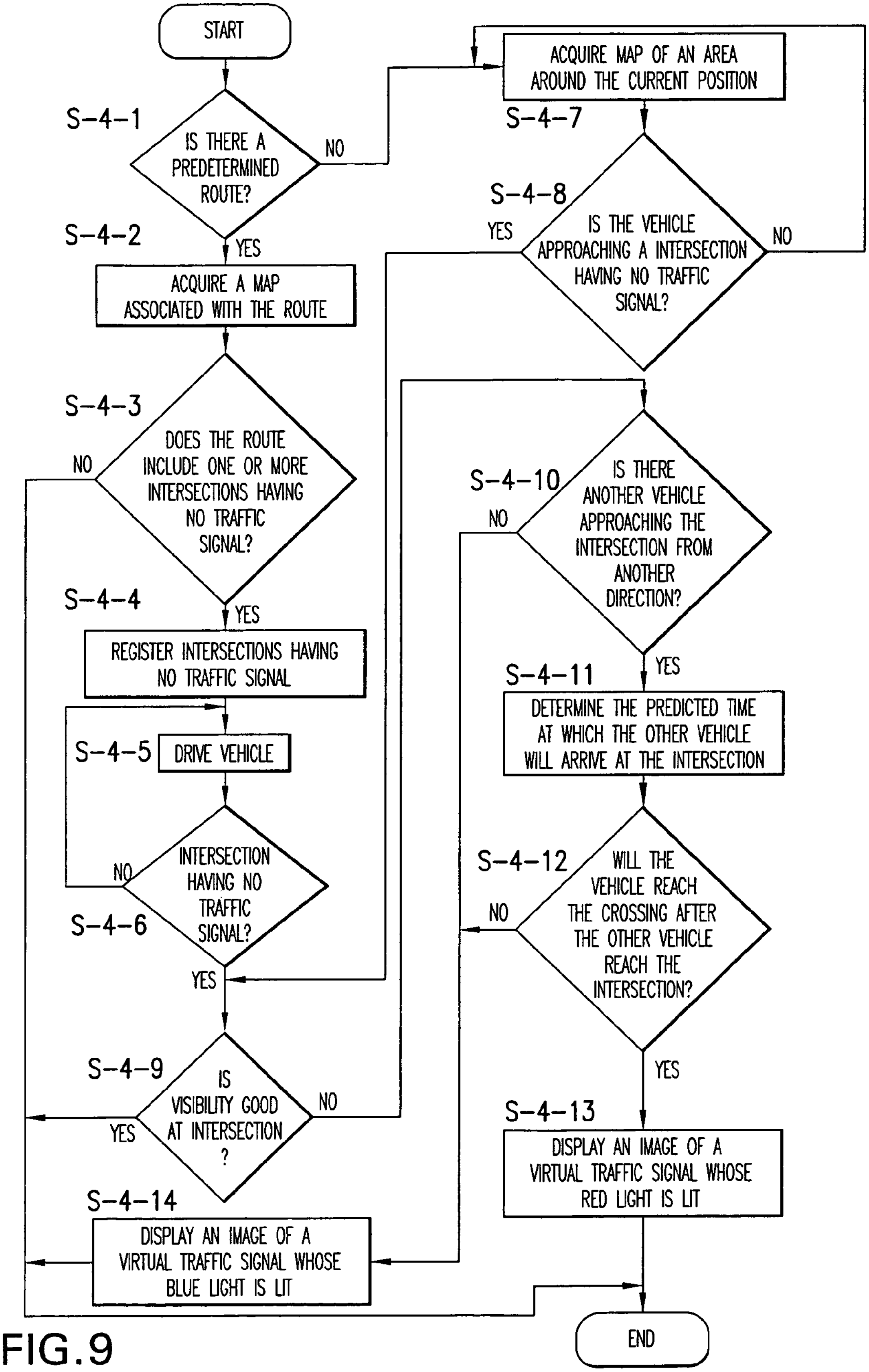
FIG. 9 is a flow chart of a process for producing a virtual image as shown in FIG. 8.

A flowchart of a routine for making this fourth judgment is shown in FIG. 9.

Figure 13D:
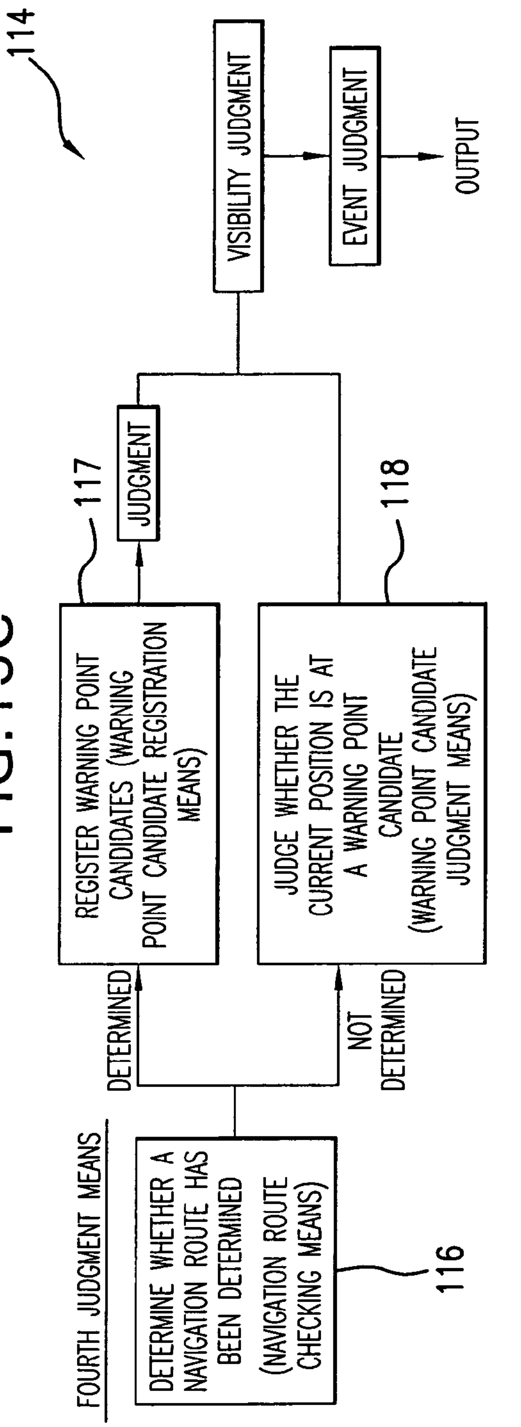

After a preliminary judgment in steps S-4-1 to S-4-8 by the navigation route checking means 116, the warning point candidate registration means 117, and the warning point judgment means 118 to determine whether the vehicle mc has reached an intersection cr having no traffic signal sg, main judgments as to the visibility and events are made in accordance with the following steps, as shown in FIG. 13(D).

Fourth Judgment (FIG. 9)

(A) Preliminary Judgment

In step S-4-1, the navigation route checking means 116 checks whether a navigation route has been determined.

The warning point candidate registration means 117 then executes the steps described below.

In step S-4-2, navigation route information (a map) indicating a route to the destination is acquired.

In step S-4-3, it is determined, based on the acquired navigation route information, whether the navigation route information includes one or more intersections cr, without a traffic signal, to be crossed by the vehicle mc.

In step S-4-4, detected intersections cr located on the determined route and having no traffic signal are registered in advance as memorized points.

In step S-4-5, the vehicle is running.

In step S-4-6, it is determined whether the vehicle mc has reached one of the registered intersections cr having no traffic signal. If so, the following judgment routine is executed, but otherwise, driving of the vehicle is continued without issuance of any warning.

The warning point judgment means 118 executes the steps described below.

In step S-4-7, when no navigation route has been determined, map information for an area surrounding the current location is acquired, and it is determined whether the vehicle mc is approaching an intersection cr having no traffic signal.

In step S-4-8, it is determined whether the vehicle mc has reached intersection. If so, the following judgment process is executed, but otherwise, the above-described steps are repeated.

(B) Main Judgment

In the main judgment routine, the "visibility judgment" and the "event judgment" are made.

Visibility Judgment

In step S-4-9, it is determined whether there is good visibility at the intersection cr ahead of the vehicle mc, based on the image information output from the on-board camera 4. More specifically, the visibility can be evaluated, for example, by determining the presence of a physical object such as a house, or can be evaluated based on navigation information. Information indicating the visibility may be registered in advance for a memorized point.

Event Judgment

In S-4-10, if it is determined that the visibility is poor, then it is further determined whether there is another vehicle oc approaching the intersection cr, based on information obtained by vehicle-to-vehicle communication or the road-to-vehicle communication.

In step S-4-11, a calculation is made to predict the arrival time of the vehicle oc, based on the location and the speed of the vehicle oc and the distance from the vehicle oc to the center of the intersection cr.

In step S-4-12, it is determined whether an on-coming vehicle oc will reach the intersection cr before the vehicle mc reaches the same intersection cr, based on the location and the speed of the vehicle mc and the distance from the vehicle mc to the center of the intersection cr.

Means for making a judgment as to occurrence of an event of which the driver should be made aware is also referred to as event judgment means.

(C) Production of Virtual Image Information

In step S-4-13, virtual image information is generated so as to include a virtual image of a traffic signal sg showing a red light, to thereby cause the driver to pay attention to the on-coming vehicle and to make it possible for the driver to reduce the speed or to stop the vehicle mc if necessary.

In step S-4-14, virtual image information is generated so as to include a virtual image of a traffic signal sg showing a green light, thereby informing the driver that the intersection cr should be passed through without stopping.

Instead of displaying a virtual image of the traffic signal, a warning in an arbitrary form may be displayed, or an image of the vehicle oc may be displayed.

5. Fifth Judgment

The fifth judgment is made by the fifth judgment means 115 when the vehicle mc is approaching a corner C, as shown in FIG. 10. In the example shown in FIG. 10, the vehicle mc is approaching a corner C at which the visibility is poor, thereby presenting a dangerous situation in which the poor visibility can hide another vehicle oc approaching the corner C from the opposite direction.

Thus, a virtual image of the hidden portion of the corner C and a virtual image of the vehicle oc coming from the opposite direction are displayed as virtual objects on the virtual screen.

In this example, the "visibility judgment" and the "event judgment" are made using the image information output from the on-board camera 4 and traffic information acquired by the vehicle-to-vehicle communication or the like.

Figure 11:
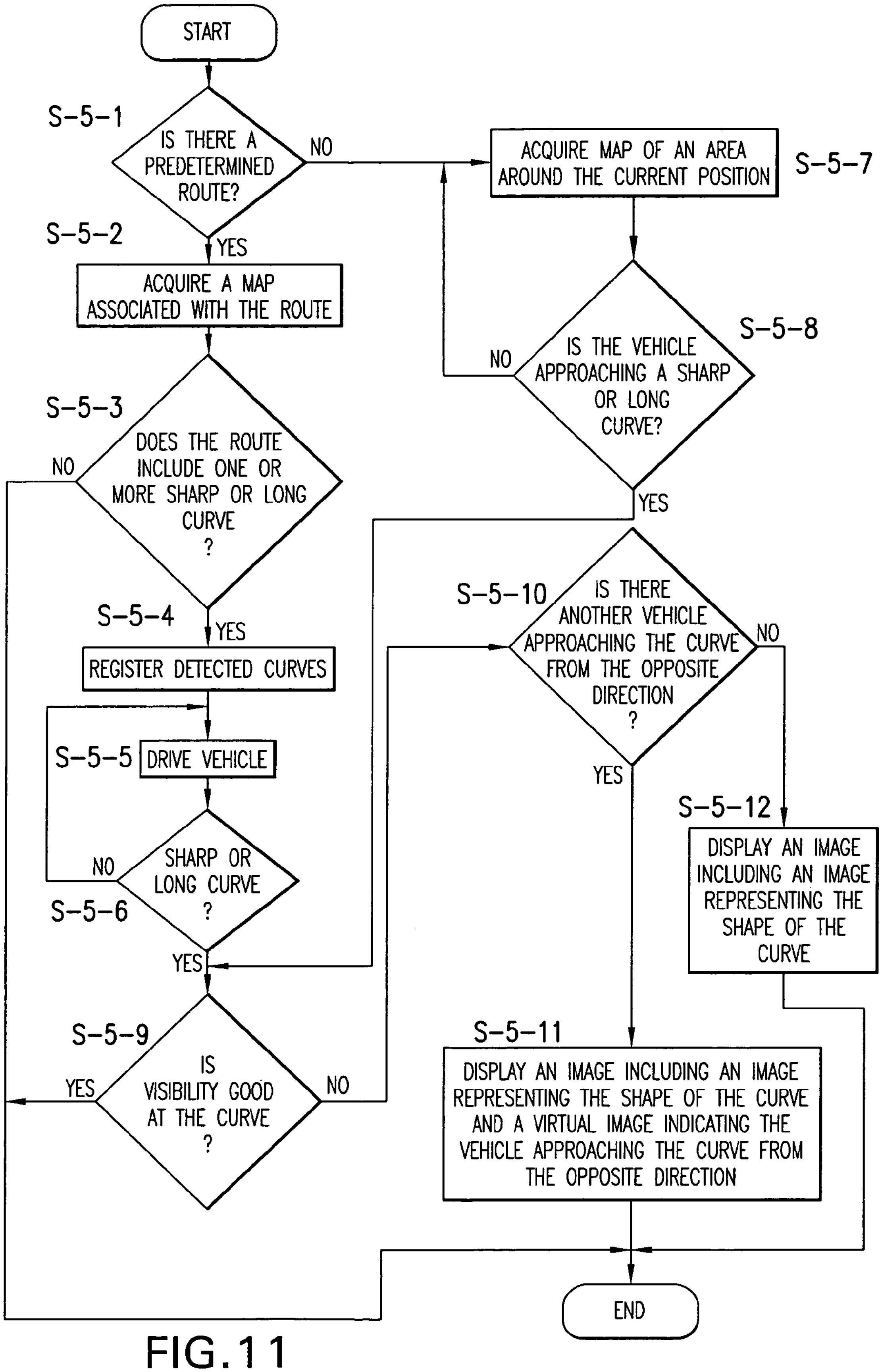
FIG. 11 is a flow chart of a process for producing a virtual image as shown in FIG. 10.

A flowchart of a routine for making these judgments is shown in FIG. 11.

Figure 13E:
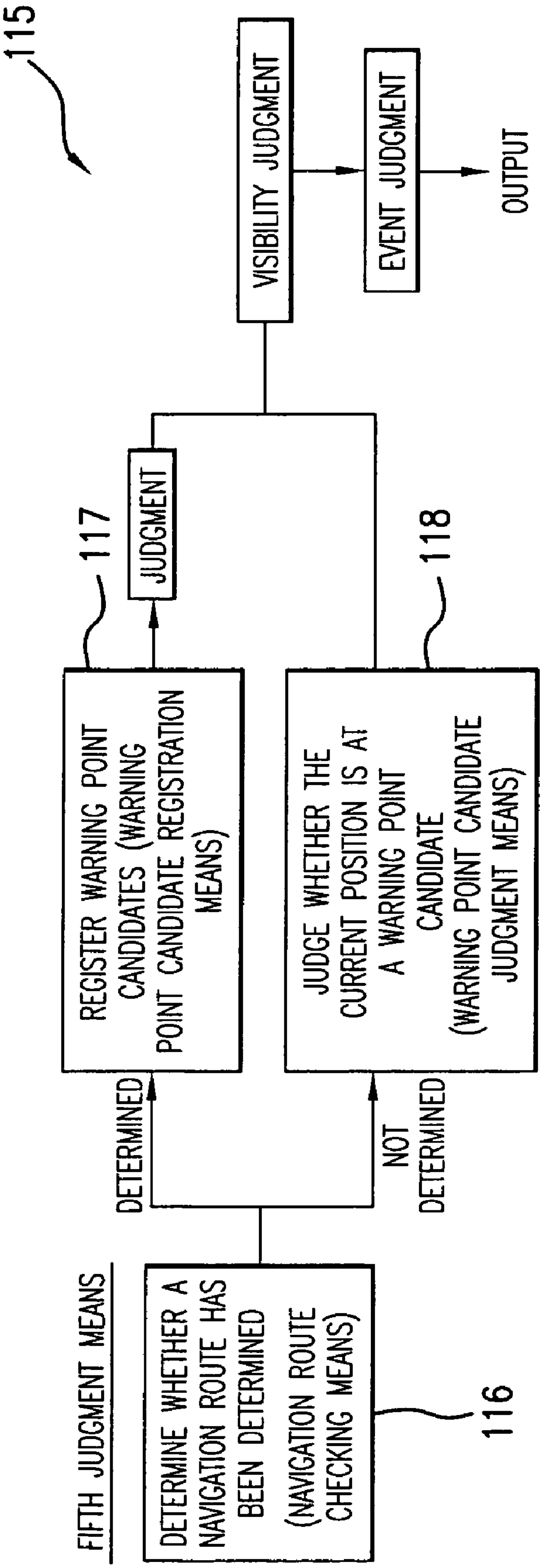

After a preliminary judgment is made in steps S-5-1 to S-5-8 by the navigation route checking means 116, the warning point candidate registration means 117, and the warning point judgment means 118, to determine whether the vehicle mc has reached a sharp or long corner C, main judgments as to the visibility and events are made in the following steps, as shown in FIG. 13(E).

Fifth Judgment (FIG. 11)

(A) Preliminary Judgment

In step S-5-1, the navigation route checking means 116 checks whether a navigation route has been determined.

The warning point candidate registration means 117 then executes the steps described below.

In step S-5-2, navigation route information (a map) indicating a route to the destination is acquired.

In step S-5-3, it is determined, based on the acquired navigation route information, whether the navigation route information includes one or more dangerous corners C, such as a sharp or long corner. The determination as to whether a corner is dangerous or not may be made by judging whether the corner satisfies a particular condition, such as the curvature of the corner, the length of the corner, and/or the number of successive corners. The degree of danger increases with the curvature of the corner, the length of the corner, and the number of successive corners.

In step S-5-4, detected dangerous corners C, such as sharp corners C or successive corners C, are registered in advance for memorized points.

In step S-5-5, the vehicle is running.

In step S-5-6, it is determined whether the vehicle mc has reached a dangerous corner C. If so, the following judgment routine is executed, but otherwise, driving of the vehicle is continued without issuance of a warning.

The warning point candidate registration means 117 then executes the steps described below.

In step S-5-7, when no navigation route has been determined, map information for an area surrounding the current position is acquired.

In step S-5-8, it is determined whether or not the vehicle mc has reached a dangerous corner C. If so, the following judgment routine is executed, but otherwise, the above-described routine is repeated.

(B) Main Judgment Process

In the main judgment routine, the "visibility judgment" and the "event judgment" are executed.

Visibility Judgment

In step S-5-9, it is determined whether there is good visibility at the corner C ahead of the vehicle mc, based on the image information output from the on-board camera 4.

The visibility can be evaluated, for example, by determining the presence of a physical object such as a house, or can be evaluated based on navigation information. Information indicating the visibility may be registered in advance for a memorized point.

Event Judgment

In step S-5-10, if it is determined that the visibility is bad, then it is further determined whether there is another vehicle oc coming from the opposite direction, based on information obtained by vehicle-to-vehicle communication or by road-to-vehicle (or station-to-vehicle) communication. Also in this case, the event judgment means is used.

(C) Production of Virtual Image Information

In step S-5-11, image information is generated which includes a virtual image of the vehicle oc coming from the opposite direction.

By displaying the virtual image, it becomes possible to notify the driver of the shape of the section of the road ahead which is hidden by the corner C or of the presence of the vehicle oc coming from the opposite direction.

In step S-5-12, image information is generated which includes a virtual image of the corner C.

By displaying the virtual image, it becomes possible to notify the driver of the shape of the hidden road ahead of the corner C.

OTHER EMBODIMENTS

Figure 12:
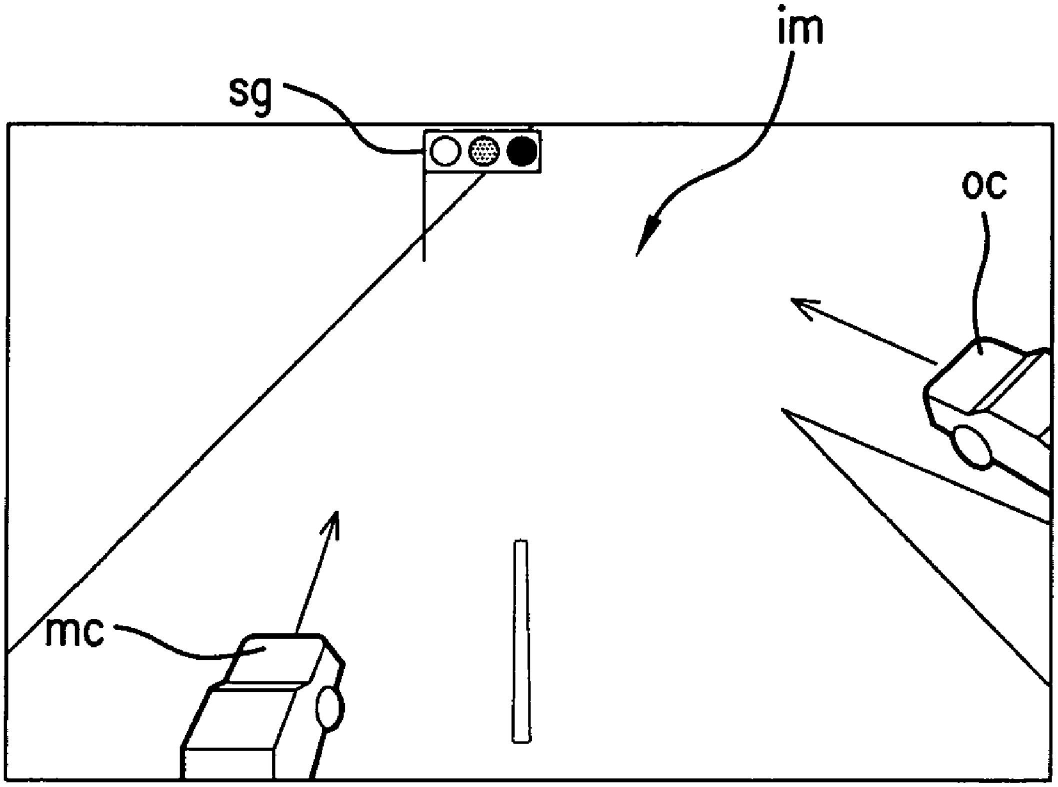
FIG. 12 is a diagram showing an image displayed on the display means wherein a vehicle is approaching a junction.

In the embodiments described above, the fourth judgment is performed, by way of example, in a situation in which the vehicle mc is going to cross through an intersection cr having no traffic signal sg. However, the fourth judgment may also be performed in a situation in which the vehicle mc is approaching a junction im having a traffic signal sg, as shown in FIG. 12. In this case, the presence of another vehicle oc approaching the junction im from another road, and furthermore the position (location) and the speed of the vehicle oc are detected from traffic information. The position and the speed of the vehicle mc are also detected, and a virtual image of a traffic signal, with a red or green light lit, is displayed depending on the predicted arrival times of the two vehicles at the junction.

In the embodiments described above, the driving support module is provided with judgment means for making a judgment as to the existence of a blind spot or as to the visibility and for outputting blind spot information indicating the result of such judgment. The output from this module can be used, not only to give a warning according to the present invention, but can also be supplied to the vehicle ECU, which may reduce the speed of the vehicle responsive thereto.

As described above, the present invention provides a system that not only uses information for the purpose of enhancing driving safety, as does a driving support system such as a navigation apparatus, but that also has a capability of displaying information in a manner in which the information can be directly used by a driver in driving the vehicle, thereby further enhancing driving safety. The present invention also provides a driving support module for use in such a system, capable of detecting a blind spot that cannot be seen by a driver and thus can result in danger to the driver and vehicle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A driving support system for a vehicle comprising:

vehicle position detection means for detecting location of the vehicle;

corner approach judgment means for judging whether or not the vehicle is approaching a corner;

image information acquisition means for image information output from an on-board camera;

judgment means for judging whether or not there is good visibility at the corner based on the output image information, responsive to a judgment by the corner approach judgment means that the vehicle is approaching a corner; and image information generation means for generating virtual image information for the corner responsive to a judgment that visibility at the corner is not good, and for outputting the generated virtual image information to display means for display superimposed on the image information captured by the on-board camera.

2. A driving support system according to claim 1, wherein, if an image of an actual object corresponding to a virtual object included in the virtual image information is obtained by the on-board camera, display of the virtual object is changed to a different mode.

3. A driving support system according to claim 1 wherein:

the judgment means judges whether or not another vehicle is approaching from the opposite direction; and responsive to a judgement that another vehicle is approaching from the opposite direction, the image information generation means generates a virtual image of the other vehicle and superimposes the virtual image of the other vehicle on the display.

* * * * *